United States Patent Office 3,486,157
Patented Dec. 23, 1969

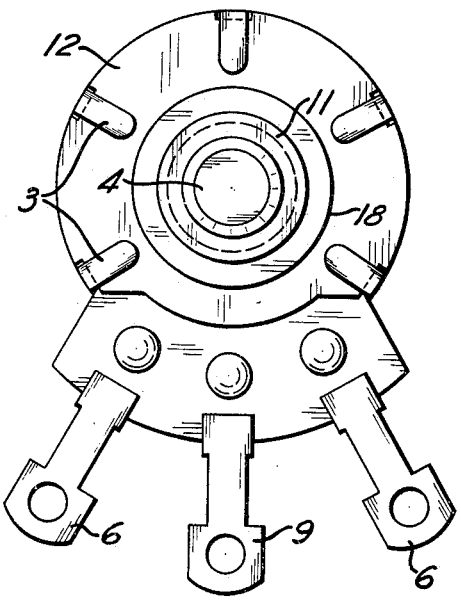
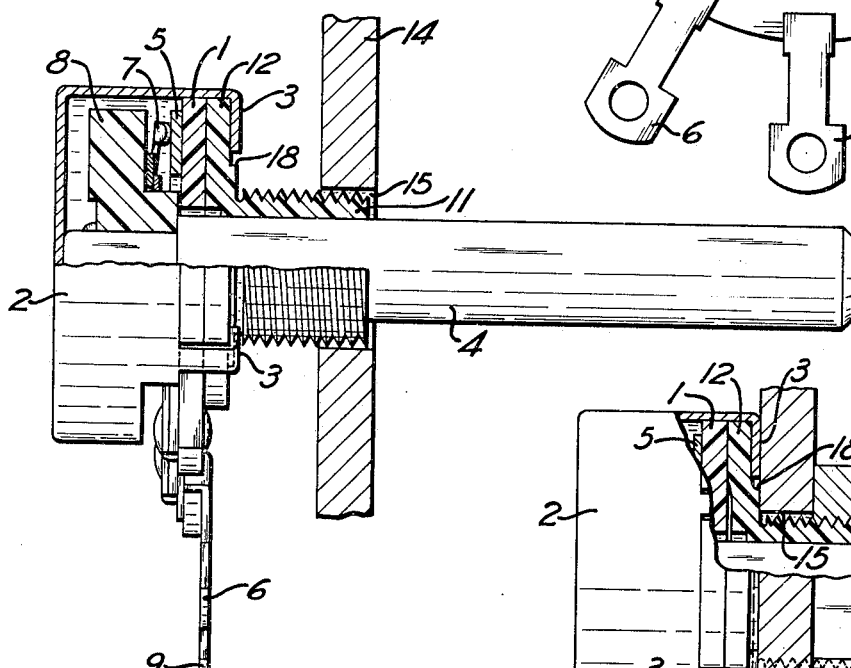
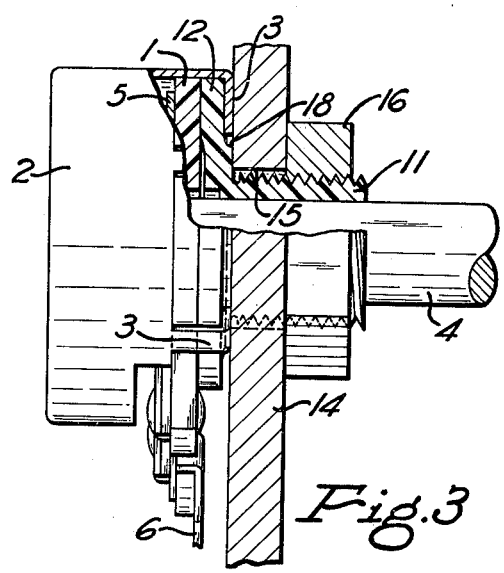
INVENTOR
DUDLEY H. CAMPBELL

3,486,157
ELECTRICAL CONTROL WITH INSULATING SHAFT BUSHING
Dudley H. Campbell, Raleigh, N.C., assignor to Stackpole Components Company, Raleigh, N.C., a corporation of Delaware
Filed May 15, 1968, Ser. No. 729,256
Int. Cl. H01c 1/02
U.S. Cl. 338—197                               2 Claims

ABSTRACT OF THE DISCLOSURE

A molded plastic threaded bushing for the rotatable shaft of an electrical control, such as a switch or variable resistor, is encircled at one end by an integral plastic mounting plate in engagement with the base member of the control. The metal cover of the control has ears that extend across the edges of the base member and the plate and lie flat against the outer face of the plate. The mounting plate has a stop portion lying in a radial plane closer than the outer surfaces of the ears to the base member to permit the ears to be clamped against a support, through which the bushing extends, by a nut on the bushing.

---

Electrical controls of the general type contemplated by this invention are well known. Such a control has its operating parts inside a housing formed by a base member and a metal cover that has ears extending across the edge of the base member. Usually, the ears are bent over the edge of the base member to hold it and the cover together. A metal bushing, encircling the control shaft that extends through the base, is encircled by a metal mounting plate held against the base member by the bent ears. The bushing is threaded so that after it has been inserted in a hole in a metal support a retaining nut can be screwed onto it to clamp the control in place. The cover is therefore grounded through the mounting plate and bushing to the support. More recently it has been proposed to mold the mounting plate and bushing in one piece from a plastic. This is cheaper than making a like part from metal or making the mounting plate and bushing as separate metal items. However, the cover of the control no longer is grounded to the metal support, due to the mounting plate and bushing being made of insulating material and the cover ears being spaced from the support by a shoulder on the bushing.

It is among the objects of this invention to provide an electrical control, in which the mounting plate and bushing are a plastic moulding, but in which the metal cover can be grounded to the metal support for the control, and the retaining nut is prevented from becoming loose.

The preferred embodiment of the invention is illustrated in the accompanying drawings, in which FIG. 1 is a front view of my electrical control;

FIG. 2 is a side view, partly in longitudinal section, of the control being inserted in a panel hole; and FIG. 3 is a fragmentary side view of the control clamped on the panel.

Referring to the drawings, the housing for an electrical control is formed from a base member 1, preferably a flat insulating member, and a cup-like metal cover 2. The cover is formed from sheet metal, generally about .020 inch thick. The edge of the cover engages the inner face of the base member near its edge, across which extend ears 3 that are integral with the cover. The center of the base is provided with an opening, through which a rotatable control shaft 4 extends. Mounted on the inner face of the base is a circuit controlling device, such as a switch or resistance element. Assuming it is an electrical resistance element 5, it extends part way around the shaft and has its ends connected to electric terminals 6 mounted on a lateral extension of the base. The resistance element is slidingly engaged by an electrical contact 7 carried by the inner end of the shaft. For example, an insulating head 8 may be rigidly mounted on the shaft, with the spring contact attached to the head. The head may bear against the end face of the metal cover or, as shown, the inner end of the shaft may engage the cover, being pressed against it by the spring contact. The contact is electrically connected in a well-known manner to a third terminal 9.

To correctly position the shaft and serve as a bearing for it, it is encircled by a bushing 11 that extends outwardly away from the base. The bushing is made of a molded plastic and is an electrical insulator. At its inner end there is a flat annular mounting plate 12 that is integral with the bushing, having been molded with it at the same time. The mounting plate seats against the outer side of the base member. To hold the cover and base and plate tightly together, cover ears 3 are bent inwardly toward the bushing over the outer edge of the plate. The ears engage flat against the outer face of the plate, whereby the base member is clamped between the metal cover and the plastic mounting plate. The mounting plate is thin enough to be deformed slightly by bending when sufficient force is applied to it, as will be explained presently. Such deformation is not permanent, as the resiliency of the plate will cause it to spring back to its original flatness if the bending force is removed.

It is a feature of this invention that when this control is attached to a support, the metal cover ears 3 will tightly engage one side of the support. Such a support, which may be a panel 14, is provided with a hole 15 through which bushing 11 extends. The outside of the bushing is threaded for receiving a retaining nut 16 (FIG. 3) that can be tightened against the outer side of the panel in order to hold the control in place. As shown in FIG. 2, the shape of the mounting plate is such that no part of it is spaced from base member 1 as far as the outer surfaces of the metal ears. Consequently, when the nut draws the control housing toward the panel there is nothing to prevent the ears from being pulled up flat against the panel. Further tightening of the nut will deform the mounting plate by pulling its inner marginal area toward the panel until stopped by a stop portion of the plate. If the entire outer face of the plate normally lies in the same flat plane, and if a high strength plastic is used that can stand the strain without fracturing or fatiguing, the portion of the outer face of the plate immediately adjoining the bushing can serve as the stop. In such a case that portion of the plate will be pulled outwardly a distance equal to the thickness of the ears, .020 inch for example. Obviously, the inner portion of the mounting plate must bend sufficiently for this to happen.

It is preferred, however, that the mounting plate not be subjected to so much bending, as it is not necessary. The bending can be reduced by making the stop portion of the mounting plate in the form of an annular shoulder 18 that is spaced radially inwardly from the inner ends of the bent ears. The shoulder is only slightly thinner than the metal ears, preferably only about .005 inch thinner, so the shoulder can be moved only that distance by the retaining nut, before its outer face is clamped against the panel as shown in FIG. 3. This limits deformation of the mounting plate to an extremely small amount, but it is sufficient to insure tight engagement of the ears with the panel. Due to the mounting plate being under tension, it serves as a spring lockwasher that prevents the nut from working loose.

Another and more important advantage of this control is that when the panel is metal and is grounded, the control housing is grounded to it directly through ears 3 even though the bushing is a plastic. Here again, the tension on the deformed mounting plate holds the ears very tightly against the panel to provide good electrical contact. When the inner end of the metal control shaft engages the end wall of the metal cover, the shaft also will be grounded to the metal panel through the cover and its ears.

The control described herein not only has all of the advantages of a control with a one-piece molded plastic bushing and mounting plate, but it retains the housing-grounding feature of controls with metal bushings and mounting plates. In addition, it has the lockwasher feature, due to deformation of the mounting plate when the control is secured to a support.

According to the provisions of the patent statutes, I have explained the principle of my invention and have illustrated and described what I now consider to represent its best embodiment. However, I desire to have it understood that within the scope of the appended claims, the invention may be practiced otherwise than as specifically illustrated and described.

I claim:

1. An electrical control comprising a base member provided with an opening therethrough and having inner and outer sides, a rotatable shaft extending through the opening, a circuit controlling means carried by the inner side of the base member, means carried by the shaft for controlling said first-mentioned means, a metal cover for said means forming with said base member a housing for them, the cover having ears extending across the edge of the base member, a molded plastic bushing extending outwardly around the shaft away from the base member for insertion in a hole in a support, and a deformable plastic mounting plate around the shaft integral with the inner end of the bushing and having an inner face engaging the outer side of said base member, said ears being bent toward the bushing into flat engagement with the outer face of the mounting plate to hold the cover and base member and plate tightly together, the bushing being provided with an external screw thread adapted to receive a retaining nut for holding the bushing in a support, and the mounting plate being provided radially inwardly from said ears with a stop portion around the bushing lying in a radial plane slightly closer than the outer surfaces of said ears to said base member, whereby when the nut is tightened on the bushing it can pull said stop portion away from the base member and against said support to press the ears tightly against the support.

2. An electrical control according to claim 1, in which said stop portion of the mounting plate is an integral shoulder thinner than said cover ears.

References Cited

UNITED STATES PATENTS

| | | | |
|---|---|---|---|
| 782,417 | 2/1905 | Robb. | |
| 3,235,679 | 2/1966 | Schaad et al. | |
| 3,298,641 | 1/1967 | Puerner | 338—197 XR |
| 3,366,911 | 1/1968 | Wilson et al. | 338—197 |

THOMAS J. KOZMA, Primary Examiner

U.S. Cl. X.R.

200—168; 338—184, 199